United States Patent
Martinez et al.

(10) Patent No.: US 9,964,769 B2
(45) Date of Patent: May 8, 2018

(54) HEAD-WEARABLE DISPLAYS WITH A TILED FIELD OF VIEW USING A SINGLE MICRODISPLAY

(71) Applicant: Google Inc., Mountain View, CA (US)

(72) Inventors: Oscar A. Martinez, Mountain View, CA (US); Ozan Cakmakci, Sunnyvale, CA (US); James C. Dunphy, San Jose, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 15/179,198

(22) Filed: Jun. 10, 2016

(65) Prior Publication Data

US 2017/0357090 A1    Dec. 14, 2017

(51) Int. Cl.
*G02B 27/01* (2006.01)
*G02B 27/10* (2006.01)
(Continued)

(52) U.S. Cl.
CPC ....... *G02B 27/0172* (2013.01); *G02B 6/0055* (2013.01); *G02B 25/001* (2013.01);
(Continued)

(58) Field of Classification Search
CPC ...... G02B 6/00; G02B 6/0011; G02B 6/0018; G02B 6/0033; G02B 6/0035; G02B 27/01; G02B 27/0101; G02B 27/017; G02B 27/0172; G02B 27/0178; G02B 27/10; G02B 27/1066; G02B 27/14; G02B 27/142; G02B 27/28; G02B 2027/0138; G02B 2027/0178; G02B 6/0055; G02B 27/286; G02B 2027/0112; G02B 2027/0125; G02B 25/001; G09G 5/00; G02F 1/0136
(Continued)

(56) References Cited

U.S. PATENT DOCUMENTS 4,340,878 A * 7/1982 Spooner ............... G02B 27/017
340/980
6,829,095 B2 12/2004 Amitai
(Continued)

FOREIGN PATENT DOCUMENTS

| WO | WO 2015/011288 A1 | 1/2015 |
|---|---|---|
| WO | WO 2015/158829 A1 | 10/2015 |
| WO | 2016132347 | 8/2016 |

OTHER PUBLICATIONS

Combined Search and Examination Report dated May 24, 2017 for European Application No. GB1621687.1, 7 pages.

*Primary Examiner* — Loha Ben (57) ABSTRACT

Implementations are described of an eyepiece for a head wearable display. The eyepiece includes a curved lightguide for guiding display light via total internal reflection between a peripherally-located input surface and a viewing region and an output coupler disposed across the viewing region to redirect the display light towards an eyeward direction for output from the curved light guide. The output coupler has an optical axis and has a set of reflective surfaces that includes at least two individual reflective surfaces to reflect incident display light toward the eyeward direction in at least two different directions relative to the optical axis of the output coupler. Other embodiments are disclosed and claimed.

30 Claims, 10 Drawing Sheets

(51) Int. Cl.
  *G02B 6/00* (2006.01)
  *G02F 1/01* (2006.01)
  *F21V 8/00* (2006.01)
  *G02B 27/28* (2006.01)
  *G02B 25/00* (2006.01)

(52) U.S. Cl.
  CPC ......... *G02B 27/01* (2013.01); *G02B 27/0101* (2013.01); *G02B 27/286* (2013.01); *G02F 1/0136* (2013.01); *G02B 27/017* (2013.01); *G02B 27/1066* (2013.01); *G02B 2027/0112* (2013.01); *G02B 2027/0125* (2013.01)

(58) Field of Classification Search
  USPC ........ 359/246, 619, 629–631; 345/7, 8, 204, 345/207; 348/115; 385/31, 33
  See application file for complete search history.

(56) References Cited

U.S. PATENT DOCUMENTS

| | | | |
|---|---|---|---|
| 7,021,777 B2 | 4/2006 | Amitai | |
| 8,814,691 B2 | 8/2014 | Haddick et al. | |
| 9,030,383 B2* | 5/2015 | Lindig | G02B 27/017 340/945 |
| 9,173,563 B2* | 11/2015 | Buckland | A61B 3/1005 |
| 9,223,139 B2 | 12/2015 | Kress | |
| 9,261,688 B2* | 2/2016 | Takeda | G02B 17/086 |
| 9,465,215 B2* | 10/2016 | Richards | G02B 27/0103 |
| 2007/0070859 A1 | 3/2007 | Hirayama | |
| 2012/0162549 A1 | 6/2012 | Gao et al. | |
| 2016/0116744 A1* | 4/2016 | Takeda | G02B 17/086 385/33 |
| 2016/0357016 A1* | 12/2016 | Cakmakci | G02B 27/0172 |
| 2016/0370589 A1 | 12/2016 | Wang et al. | |
| 2017/0059868 A1* | 3/2017 | Takeda | G02B 27/0172 |
| 2017/0192238 A1* | 7/2017 | Riedel | G02B 27/0172 |

* cited by examiner

HEAD-WEARABLE DISPLAYS WITH A TILED FIELD OF VIEW USING A SINGLE MICRODISPLAY

TECHNICAL FIELD

The disclosed embodiments relate generally to head-wearable displays (HWDs) and in particular, but not exclusively, to head-wearable displays using a single microdisplay and having a tiled field of view.

BACKGROUND

A head-wearable display ("HWD") is a display device worn on or about the head. HWDs usually incorporate some sort of near-to-eye optical system to create a magnified virtual image placed a few meters in front of the user. Single eye displays are referred to as monocular HWDs while dual eye displays are referred to as binocular HWDs. Some HWDs display only a computer generated image ("CGI"), while other types of HWDs are capable of superimposing CGI over a real-world view. This latter type of HWD typically includes some form of see-through eyepiece and can serve as the hardware platform for realizing augmented reality. With augmented reality the viewer's image of the world is augmented with an overlaying CGI, also referred to as a heads-up display ("HUD").

HWDs have various practical and leisure applications. Aerospace applications permit a pilot to see vital flight control information without taking their eye off the flight path. Public safety applications include tactical displays of maps and thermal imaging. Other applications include video games, transportation, and telecommunications. New practical and leisure applications will certainly be found as the technology evolves, but many of these applications are limited due to the cost, size, weight, thickness, field of view, and efficiency of conventional optical systems used to implement existing HWDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION OF THE ILLUSTRATED EMBODIMENTS

Embodiments are described of an apparatus, system and method for head-wearable displays using a single microdisplay and a tiled field of view. Specific details are described to provide an understanding of the embodiments, but one skilled in the relevant art will recognize that the invention can be practiced without one or more of the described details or with other methods, components, materials, etc. In some instances well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that "in one embodiment" or "in an embodiment" do not necessarily all refer to the same embodiment. Furthermore, the described features, structures, or characteristics can be combined in any suitable manner in one or more embodiments.

Figures 1A, 1B:
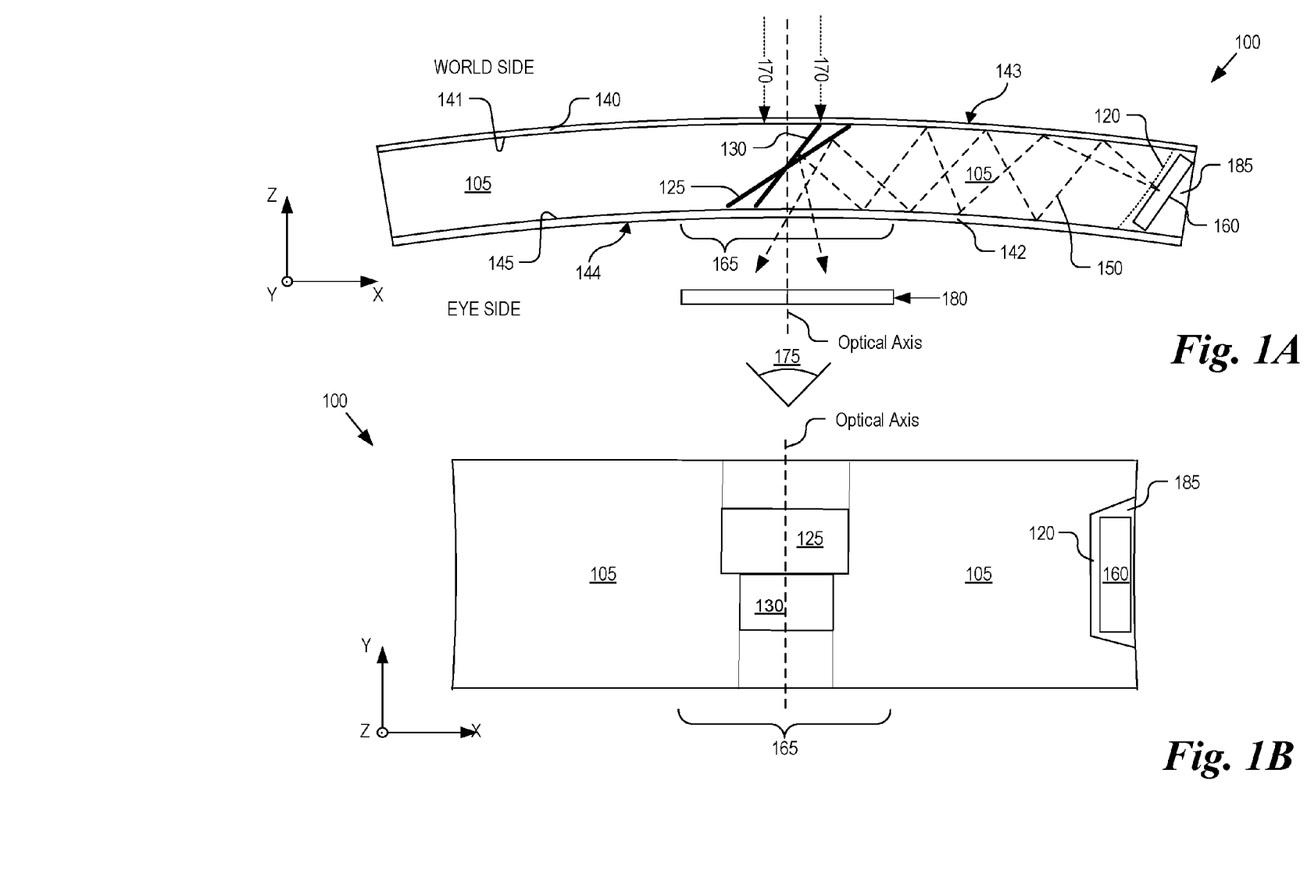
FIGS. 1A-1B are top and rear views, respectively, of an embodiment of a see-through eyepiece for a head-mounted display.

FIGS. 1A-1B together illustrate an embodiment of a curved see-through eyepiece 100 having a tiled field of view. FIG. 1A is a top view of eyepiece 100, FIG. 1B a rear view. Eyepiece 100 includes a curved light guide 105, input surface 120, an output coupler made up of a set of reflective faces 125 and 130, cladding layers 140 and 142, a world-side surface 143, and an eye-side surface 144.

Eyepiece 100 guides display light 150 from peripherally-located display source 160 to viewing region 165, where an output coupler including reflective surfaces 125 and 130 redirects display light 150 out of eyepiece 100 in an eyeward direction. Although described as reflective surfaces, in most embodiments reflective surfaces 125 and 130 will have a reflectivity between 0% and 100%—in other words, the reflective surfaces will be partially reflective so that they can reflect display light in the eye-ward direction while allowing ambient light 170 to pass through. In one embodiment, for instance, reflective surfaces 125 and 130 can be 50% reflective, meaning that they reflect 50% of the incident light but allow the other 50% to pass through. In different embodiments, reflective surfaces 125 and 130 can be formed with beam splitters, polarizing beam splitters, multi-layer dichroic films, half-silvered mirrors, etc.) that reflect incident display light 150 while allowing at least a portion of ambient light 170 incident through world side surface 143 to pass through tiled viewing region 165 to eye 175. In various embodiments, reflective surfaces 125 and 130 can include additional optical elements or coatings, such as polarizers or filters, so that the reflective surfaces reflect incident light differently.

The display light 150 redirected out eyepiece 100 by reflective surfaces 125 and 130 is emitted as a unified image 180 superimposed over ambient light 170. In the illustrated embodiment, the set of reflective surfaces 125 and 130 are vertically spaced apart from each other (i.e., spaced in the y direction) but are both positioned in a central portion of viewing region 165. In other embodiments the set of reflective surfaces can be positioned differently, for instance laterally spaced from each other (i.e., spaced apart in the x direction; see FIGS. 9A-9B).

In the illustrated embodiment the output coupler has a set of two reflective surfaces 125 and 130 that substantially abut each other, but in other embodiments there can be more than two reflective surfaces (see, e.g., FIGS. 2B and 3A-3B) and the reflective surfaces need not abut. Generally, the larger the number of reflecting surfaces in the set the better the uniformity of the resulting image and field of view. The individual reflective surface 125 and 130 are positioned at an angle relative to each other and at different angles relative to an optical axis, so that the output coupler, with its set of reflective surfaces, reflects display light in at least two different directions. Reflective surfaces 125 and 130 can have positive optical power, negative optical power, or no optical power at all, and need not have the same optical power, whether positive, negative, or zero.

Display source 160 launches display light 150 into input surface 120, which is at the periphery or edge of eyepiece 100. By guiding display light 150 towards the central region of eyepiece 100 and using both reflective surfaces 125 and 130, the field of view ("FOV") of eyepiece 100 is an expanded FOV that can be thought of as "tiled," since it is formed by reflections from multiple reflecting surfaces. This output coupler arrangement facilitates larger FOVs and an improved user experience within a thin lens encapsulation (e.g., less than 4 mm).

Display source 160 is positioned peripherally from the user's center of vision. Curved light guide 105 guides display light 150 received through input surface 120 to reflective surfaces 125 and 130 via total internal reflection ("TIR"). In one embodiment, TIR at surfaces 141 and 145 is promoted by ensuring that the refractive index of curved light guide 105 is higher than the refractive index of cladding layers 140 and 142, which conform to and extend across the world side and eye side of curved light guide 105. In other embodiments, a low index adhesive is used to bond cladding layers 140 and 142 to curved light guide 105. In this low index adhesive embodiment, the adhesive provides the index boundary to promote TIR while cladding layers 140 and 142 serve as protective layers that provide a smooth, continuous curvature for world side surface 143 and eye side surface 144.

As an example, curved light guide 105 can be made of an optical grade plastic having a refractive index ranging between 1.5 and 1.7, while the adhesive that bonds cladding layers 140 and 142 can have a refractive index of approximately 1.3. In other embodiments, cladding layers 140 and 143 can be omitted and an air boundary with curved light guide 105 provides the TIR interface. Other material and index ranges can be used in other embodiments.

The components of eyepiece 100 are bonded together to form a single see-through lens. In one embodiment, world side surface 143 and eye side surface 144 have complementary curvatures such that eyepiece 100 has effectively zero optical power for ambient light 170 passing through. In other embodiments, these curvatures may provide prescriptive lensing. The curvatures of surfaces 141 and 145, which are at the interface of curved light guide 105 with cladding layers 140 and 143, operate together to adjust the vergence of display light 150 with each successive refraction/reflection to magnify and virtually displace unified image 180 presented to eye 175. The image is virtually displaced back from eye 175 by a distance (e.g., 1 m to 10 m) that enables eye 175 to comfortably bring the near-to-eye display into focus. In other words, the curved sides of light guide 105 operate to both transport display light 150 from the peripheral location to viewing region 165 while simultaneously collimating, or nearly collimating, the display light. This design of eyepiece 100 reduces the number of optical components and reduces its fabrication and assembly complexities.

In the illustrated embodiment, display source 160 is disposed within a recess 185 and tilted to face towards the world side. In one embodiment input surface 120 is also tilted such that its inward normal vectors tilt towards the world side. In this configuration, the first TIR reflection once display light 150 enters curved light guide 105 through input surface 120 is off the world side. In the illustrated embodiment, input surface 120 is a curved surface with refractive optical power. Display source 160 can be implemented using various micro-display technologies such as a liquid crystal display ("LCD"), liquid crystal on silicon (LCOS), an organic light emitting diode ("OLED") display, or otherwise.

Figure 2A:
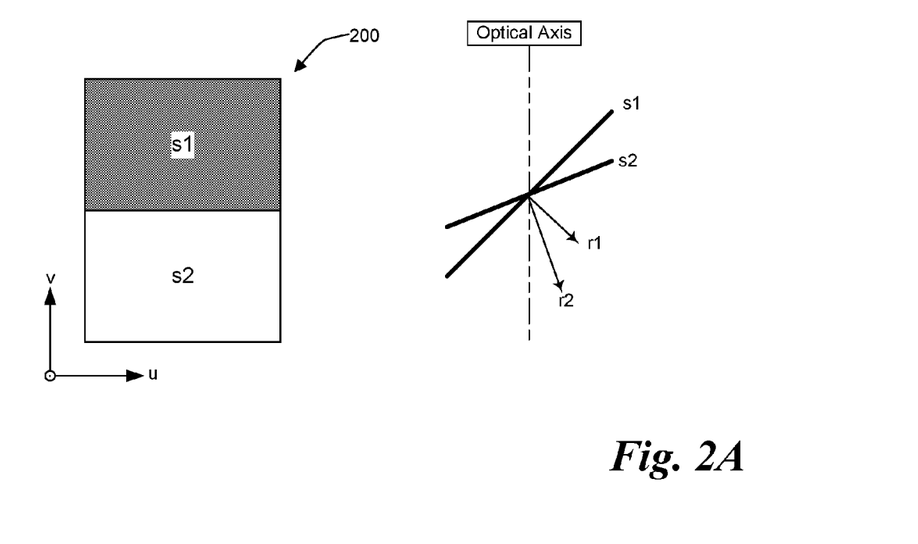
FIGS. 2A-2B are front views of embodiments of output couplers.
Figure 2B:
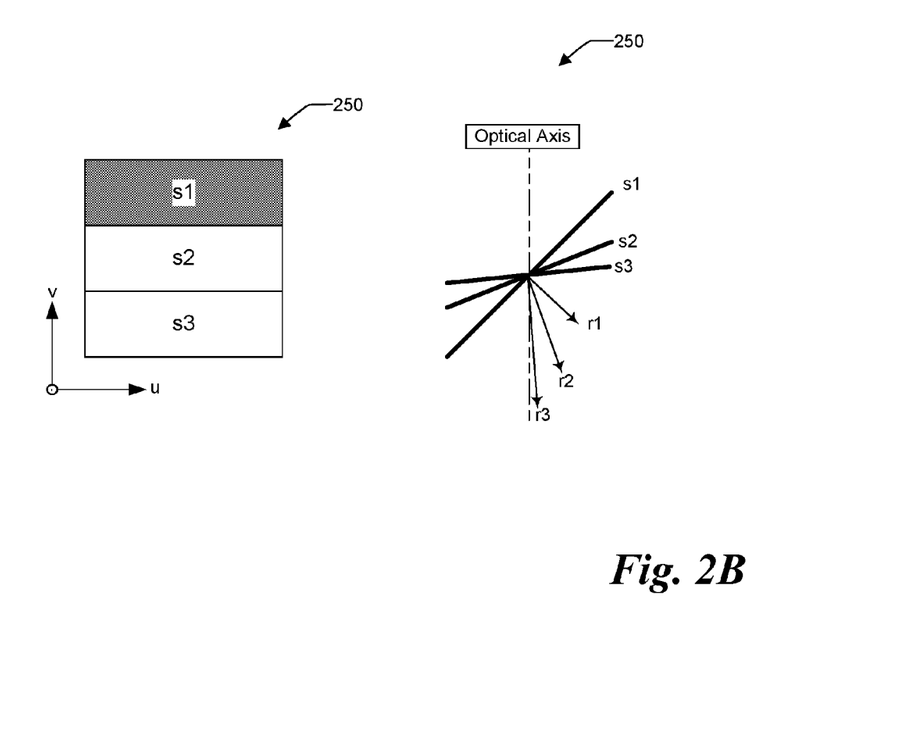

FIGS. 2A-2B illustrate embodiments of output couplers that can be used with eyepiece 100. FIG. 2A illustrates an embodiment of output coupler 200 that includes a set of two individual reflective surfaces s1 and s2. Surfaces s1 and s2 each occupy part of the vertical dimension (v) of the coupler and all of the horizontal dimension (u) of the coupler. Put differently, in the illustrated embodiment surfaces s1 and s2 are horizontally-running strips. In the illustrated embodiment surfaces s1 and s2 have the same vertical dimension, but in other embodiments they need not. The illustrated embodiment shows s1 and s2 as planar surfaces, but in other embodiments s1 and s2 need not be planar but can instead be curved, a combination of planar facets, combination of planar and curved, etc. Surfaces s1 and s2 can have positive optical power, negative optical power, or no optical power at all, and need not have the same optical power, whether positive, negative, or zero.

As shown on the right side of FIG. 2A, within the set of reflective surfaces, surfaces s1 and s2 are positioned at different angular orientations relative to each other and relative to an optical axis. As a result, reflective surfaces s1 and s2 reflect incident display light in different directions from each other: surface s1 reflects in direction r1 and surface s2 reflects in direction r2. In one embodiment the reflection direction can be measured by the angle of the chief ray of the reflected light, but reflection direction can be measured differently in other embodiments.

FIG. 2B illustrates another embodiment of an output coupler 250. Output coupler 250 includes a set of more than two individual reflective surfaces—in this case three surfaces s1, s2, and s3. Surfaces s1, s2, and s3 each occupy part of the vertical dimension (v) of the coupler and all of the horizontal dimension (u) of the coupler. Put differently, this embodiment can be thought of as a one-dimensional division of the coupler in which surfaces s1, s2, and s3 are horizontally-running strips that extend over the coupler's entire horizontal (u) dimension but only over part of the coupler's vertical (v) dimension. As a result reflective surfaces s1, s2 and s3 are horizontally-running strips (i.e., along the u direction). In the illustrated embodiment s1, s2, and s3 have the same vertical and horizontal dimensions, but in other embodiments their dimensions need not be the same. In the illustrated embodiment surfaces s1-s3 are planar, but in other embodiments s1-s3 need not be planar, but can instead be curved, a combination of planar facets, combination of planar and curved, etc. In various embodiments surfaces s1-s3 can have positive optical power, negative optical power, or no optical power at all and need not all have the same optical power, whether positive, negative, or zero.

As seen on the right side of FIG. 2B, surfaces s1, s2, and s3 are positioned at different angular orientations relative to each other and relative to an optical axis. As a result, surfaces s1-s3 reflect incident display light in different directions from each other: surface s1 reflects in direction r1, surface s2 reflects in direction r2, and surface s3 reflects in direction r3. In one embodiment reflection direction can be measured using the angle of the chief ray of the reflected light, but reflection direction can be measured differently in other embodiments.

In some embodiments all surfaces s1-s3 reflect in different directions as shown, so that no two reflective surfaces reflect in the same direction. But in embodiments like this one with couplers having a set of more than two surfaces, the set of reflective surfaces can include subsets of reflective surfaces that do reflect in the same direction. For instance, in one embodiment (not shown) surfaces s1 and s3 can form a subset of surfaces that reflect in the same direction (i.e., r1 and r3 are the same direction), while surface s2 forms a subset of surfaces that reflects in a different direction r2. In such embodiment each subset need not have the same number of individual reflecting surfaces.

Figure 3A:
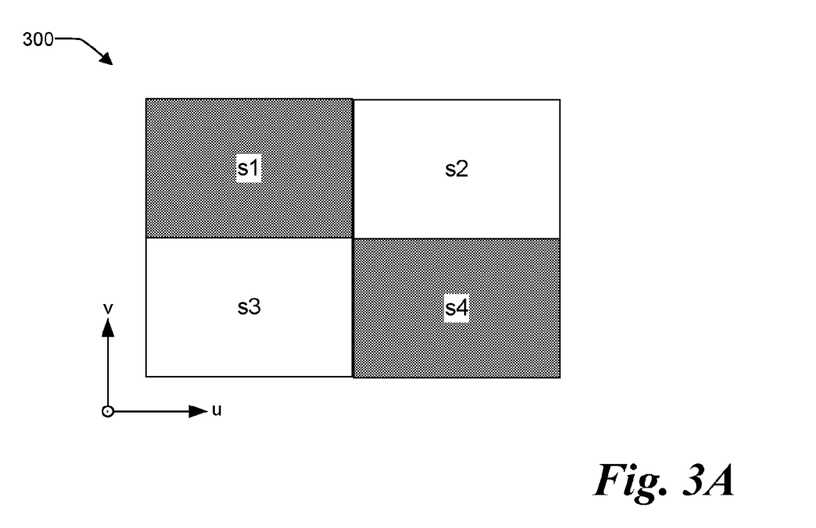
FIGS. 3A-3B are front views of other embodiments of output couplers.
Figure 3B:
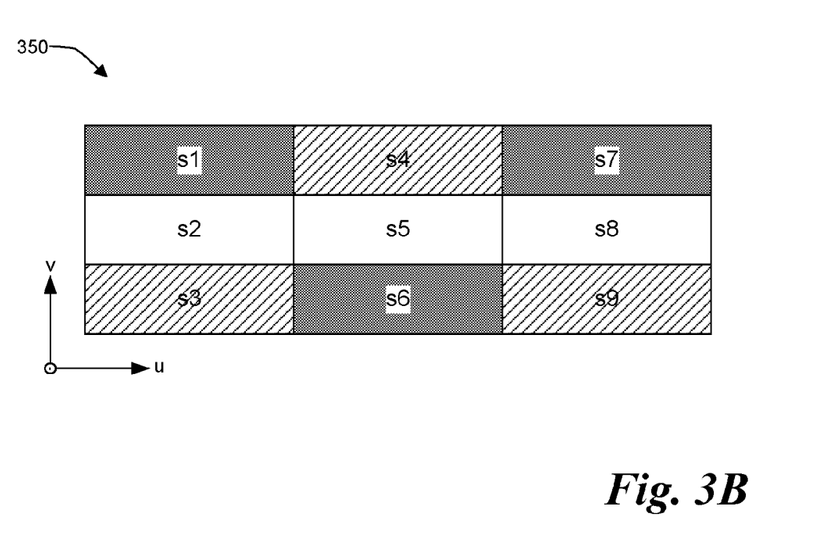

FIGS. 3A-3B illustrate embodiments of output couplers that can be used with eyepiece 100. FIG. 3A illustrates an embodiment of an output coupler 300 that includes a set of more than two individual reflective surfaces—in this case four reflective surfaces s1, s2, s3, and s4. Each surface s1-s4 occupies part of the vertical dimension (v) of the coupler and part of the horizontal dimension (u) of the coupler. The result is a two-dimensionally tiled or tessellated output coupler in which reflective surfaces s1-s4 are tiles whose vertical dimension is a fraction of the optical coupler's vertical dimension (v) and whose horizontal dimension is a fraction of the optical coupler's horizontal (u) dimension. In the illustrated embodiment surfaces s1, s2, s3, and s4 all have the same size—that is, they have the same vertical and horizontal dimensions and hence the same area—but in other embodiments the individual reflective surfaces in the output coupler need not have the same dimensions. As in previous embodiments, surfaces s1-s4 need not be planar but can instead be curved, can be a combination of planar facets, combination of planar and curved, etc. Surfaces s1-s4 can have positive optical power, negative optical power, or no optical power at all and need not all have the same optical power, whether positive, negative, or zero.

As in previous embodiments, each of surfaces s1-s4 is positioned at an angular orientation with respect to the others and at an angle relative to an optical axis. In one embodiment, reflective surfaces s1-s4 reflect incident display light in different directions from each other: surface s1 reflects in direction r1, surface s2 reflects in direction r2, and surface s3 reflects in direction r3, and so forth, so that no two surfaces reflect in the same direction. But in embodiments like this one with output couplers having a set of more than 2 surfaces, the set of surfaces s1-s4 can include subsets of surfaces that do reflect in the same direction. For instance, in one embodiment surfaces s1 and s4 can form a subset of surfaces that reflect in the same direction, while surface s2 and s3 form a subset that both reflect in a different direction than s1 and s4. In other embodiments each subset need not have the same number of individual reflecting surfaces. In one embodiment the reflection direction can be measured by the chief ray angle of the reflected light, but reflection direction can be measured differently in other embodiments.

FIG. 3B illustrates another embodiment of an output coupler 350. Output coupler 350 is similar in most respects to 300, except that it includes a set of nine individual reflecting surfaces s1-s9. Like output coupler 300, output coupler 350 is also a two-dimensional division of the coupler: each reflective surface occupies part of the overall horizontal dimension (u) of the coupler and part of the vertical dimension (v) of the coupler, so that surfaces s1-s9 are tiles. In the illustrated embodiment surfaces s1-s9 have the same vertical and horizontal dimensions, but in other embodiments the dimensions of surfaces s1-s9 need not be the same. As in previous embodiments, reflective surfaces s1-s9 can be flat, curved, a combination of planar facets, combination of planar and curved, etc., and can have positive optical power, negative optical power, or no optical power at all. In some embodiments all surfaces s1-s9 reflect in different directions so that no two reflective surfaces reflect in the same direction, but in other embodiments the set of reflective surfaces can include subsets of reflective surfaces that do reflect in the same direction.

Figure 4A:
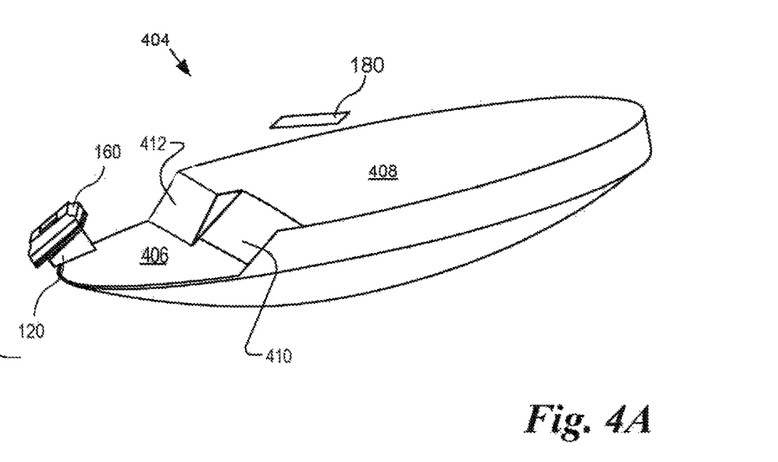
FIGS. 4A-4B are perspective views of embodiments of a pair of eyepiece parts used to assemble an embodiment of a see-through eyepiece.
Figure 4B:
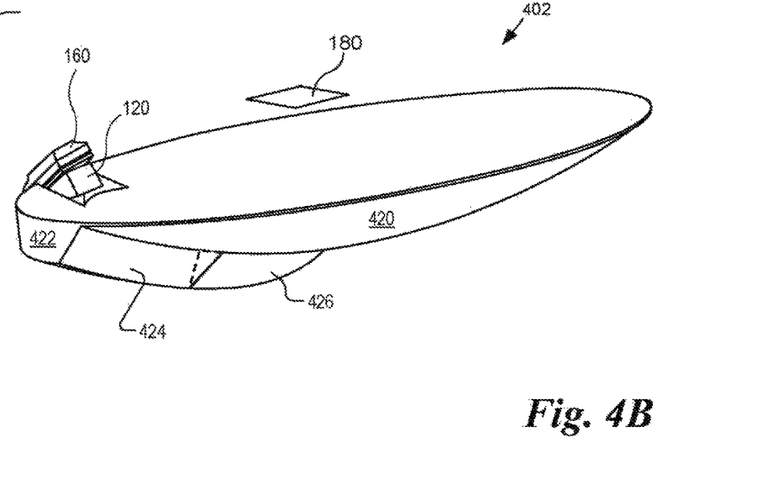

FIGS. 4A-4B together illustrate an embodiment of a curved eyepiece 400 formed from two mated lens bodies 402 and 404; FIG. 4A is an exploded view of lens body 404, FIG. 4B an exploded view of lens body 402. The illustrated embodiment is a curved eyepiece with an output coupler that has a set of two individual reflecting surfaces, but eyepieces with other embodiments of output couplers having more than two individual reflecting surfaces can be similarly built.

As illustrated, lens body 404 includes a thin portion 406, a thick portion 408, and transition surfaces 410 and 412 disposed at the transition between thin portion 406 and thick portion 408. Similarly lens body 402 includes a thin portion 420, a thick portion 422, and transition surfaces 424 and 426 disposed at the transition between thin portion 420 and thick portion 422. When lens bodies 402 and 404 are put together, transition surface 412 mates with transition surface 426 to form one of the reflective surfaces of the output coupler, while transition surface 410 mates with transition surface 424 to form the other reflective surface of the output coupler. Although not shown, additional coatings such as polarizing films, color filters, partially reflective layers, switchable mirrors, etc., can be applied to transition surfaces 410, 412, 424, and 426 before lens bodies 402 and 404 are mated to each other.

Curved eyepiece 400 is implemented as a thin, curved eyepiece having a thickness less than 8 mm, and in one embodiment is about 4.0 mm thick. In one embodiment lens bodies 402 and 404 are formed of transparent optical grade plastic (e.g., polycarbonate, etc.) having an index of refraction of 1.64, but the higher the refractive index the thinner the curved eyepiece can be. A direct benefit of using higher index material is to reduce the angle at which TIR occurs. This effectively enables designs that reduce the angle of the output coupler, which can either increase the size of the eyebox for a given lightguide thickness or reduce the overall thickness of the lightguide for a given eyebox size. Using higher index material for the curved eyepiece can also provide more flexibility in the refractive index of the optical grade adhesives used to bond lens bodies 402 and 404 together.

In one embodiment, lens body 402 can be mated to lens body 404 using a clear adhesive having a refractive index that is less than the refractive index of lens bodies 402 and 404. The low index clear adhesive forms a total internal reflection boundary between the two lens bodies 402 and 404, which defines an interior boundary of the curved lightguide 400 at thick portion 422 of lens body 402. In other embodiments other coatings such as an angle sensitive multi-layer dichroic coating can also be used. Still other embodiments can use a low-index material coating with a standard index adhesive over it to essentially form a one-layer dichroic coating.

In one embodiment the curvatures of both eye-ward facing surface and world-facing surface in eyepiece 400 can be implemented as spherical surfaces. In one embodiment the world-facing surface provides a complementary curvature to offset the optical power of the curvature of the eye-ward facing surface encountered by ambient light. In other embodiments, the curvatures of the world facing surface and the eye-ward facing surface can be unbalanced to impart prescriptive lensing to ambient light. Thus, curved eyepiece 400 operates as a see-through display that combines ambient light with display light to display an augmented reality to a user.

Collectively, the curvature and slim nature of eyepiece 400 provide a desirable industrial design. Eyepiece 400 not only has desirable industrial design, but is also efficient since ideally the only lossy bounce for display light 150 (from display source 160) traveling from input surface 120 to the output coupler is the single redirection by the output coupler. This permits the optical coupler and viewing region 165 (FIG. 1) to be substantially more transmissive than reflective thereby improving the see-through characteristic of eyepiece 400 in viewing region 165.

Figures 5A, 5B, 5C:
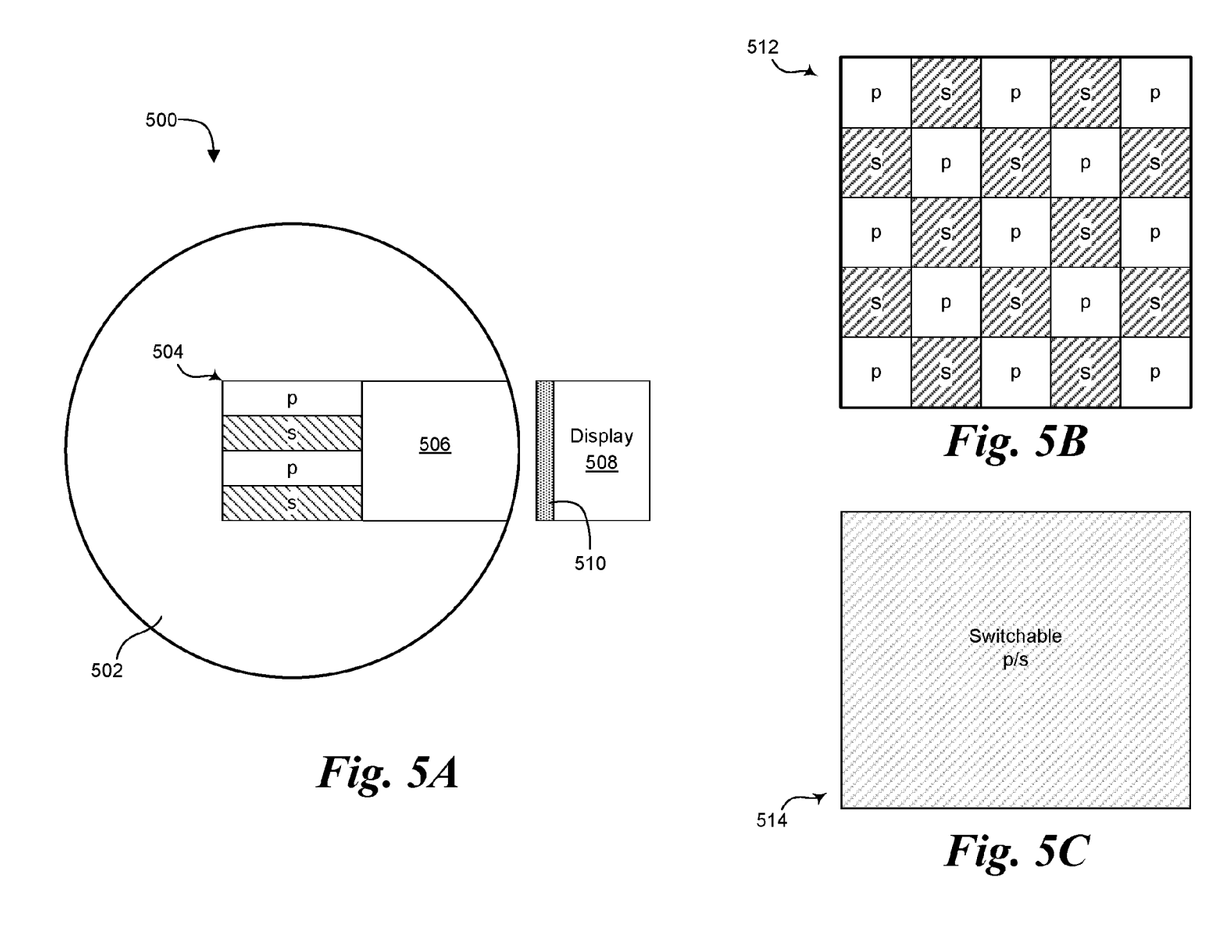
FIGS. 5A-5C are diagrams of an embodiment of a head-wearable display including see-through eyepiece and embodiments of a display source that can be used with the illustrated eyepiece.

FIGS. 5A-5C illustrate embodiments of a head-wearable display (HWD) 500. HWD 500 includes an eyepiece 502 having an output coupler 504 formed therein in a position that will substantially align with a user's eye. Waveguide 506 is formed in eyepiece 502 and extends from output coupler 504 to the edge or periphery of eyepiece 502. A display source 508 with an optically coupled polarizing filter 510 is positioned at the periphery of eyepiece 502 so that it can launch display light into waveguide 506. Eyepiece 502 can be as described in FIGS. 4A-4B, and although shown as round can have other shapes in other embodiments.

Output coupler 504 includes a set of four reflective polarizing surfaces, although a different number of reflective surfaces is possible in other embodiments; other embodiments, for instance, can use more than four or less than four reflective polarizing surfaces. Each polarizing surface has one of two polarization states: s-polarized and p-polarized. In one embodiment each reflective polarizing surface can be made polarizing by placing a polarizing film on it, but in other embodiments polarization-dependent dielectric thin film coatings can be used for polarization. In still other embodiments, the reflective polarizing surfaces can be made, and potentially made more transparent, with polarizing reflectors made from alternating layers of normal and birefringent polymer, such as the polarizing reflectors made by the 3M company of Minneapolis, Minn., USA.

In some embodiments the polarization of each reflective surface can be fixed, but in other embodiments the polarization of each reflective polarizing surface can be switchable, so that the polarization of each reflective surface can be switched between polarization states (e.g., between s-polarization and p-polarization) at a selected frequency. in one embodiment, for instance, the switching rate could be 120 Hz to provide 60 Hz for each subset of reflective polarizing surfaces. In other embodiments the switching rate can be higher than 120 Hz.

In the illustrated embodiment two of the four reflective polarizing surfaces are p-polarizing, the other two are s-polarizing. Each individual reflective surface in the set of four reflective surfaces can reflect in a different direction or they can be grouped into subsets within which reflective polarizing surfaces reflect in the same direction. For instance, in an embodiment where the polarization of individual surfaces in output coupler 504 is not switchable, each subset of segments with like polarization can point in the same direction, so that in this embodiment two unique subsets are achieved—s and p. In another embodiment, for instance one where the reflective polarizing surfaces are switchable, one subset of two reflective surfaces can include one p-polarized surface and one s-polarized surface that both reflect in a first direction, while another subset of two surfaces can include one p-polarized surface and one s-polarized surface that both reflect in a second direction. That way each reflection direction gets both polarizations.

FIGS. 5B-5C illustrate embodiments of polarizers that can be optically coupled to display 508. FIG. 5B illustrates a polarizer 512 that is a tessellated matrix of polarizing cells. The polarizing cells alternate row-wise (horizontally in the figure) and column-wise (vertically in the figure) between s-polarization and p-polarization. FIG. 5C illustrates an embodiment of a switchable polarizer 514. At any instant the entire area of polarizer 514 has only one polarization, but that polarization can be switched between s- and p-polarization at a selected frequency. The selected frequency is high enough that the polarization switching will not be noticed by a user; in one embodiment, for instance, the switching rate could be 120 Hz to provide 60 Hz for each subset of reflecting surfaces. In other embodiments the switching rate can be higher than 120 Hz.

In operation of HWD 500, display light from display source 508 travels through polarizer 510 and is launched into waveguide 506. The polarized display light travels through waveguide 506 to output coupler 504, which redirects the polarized display light toward a user's eye, as shown in FIGS. 1A-1B. In an embodiment where polarizer 510 is a tessellated polarizer like polarizer 512, the display light that is p-polarized is reflected by individual reflective surfaces with p-polarizers on them and the display light that is s-polarized is reflected by individual reflective surfaces with s-polarizers on them. In an embodiment where polarizer 510 is switchable like polarizer 514, while the display light is p-polarized it is reflected by individual reflective surfaces with p-polarizers on them and while the display light is s-polarized it is reflected by individual reflective surfaces with s-polarizers on them. In an embodiment where both polarizer 510 and the reflective polarizing surfaces in output coupler 504 are switchable, the switching frequencies of polarizer 510 and the reflective polarizing surfaces in output coupler 504 can be synchronized so that the user perceives no flicker.

Figure 6A:
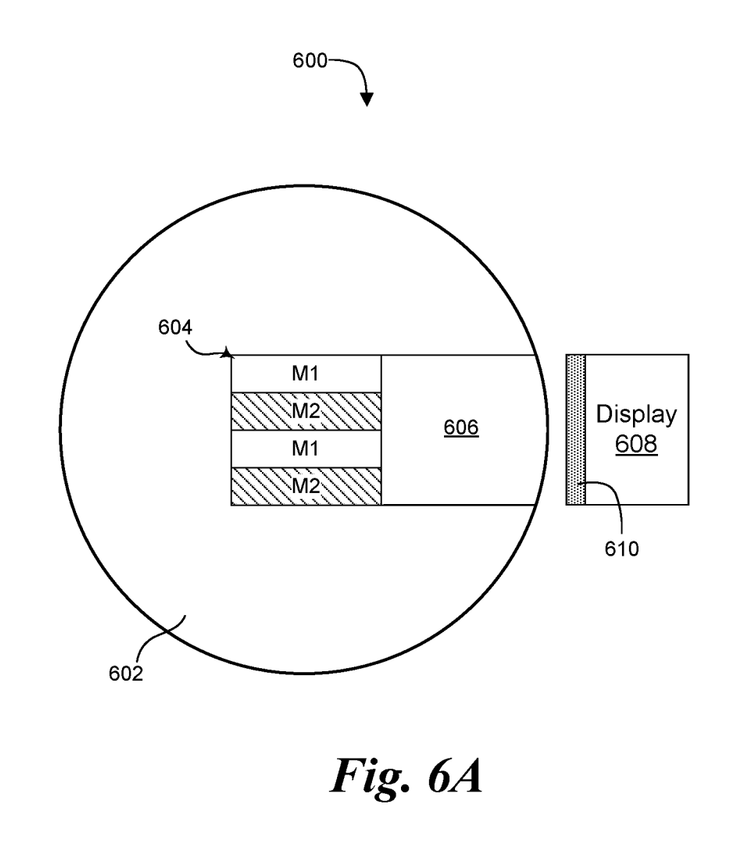
FIGS. 6A-6B are diagrams of another embodiment of a head-wearable display including see-through eyepiece and embodiments of a display source that can be used with the illustrated eyepiece.
Figure 6B:
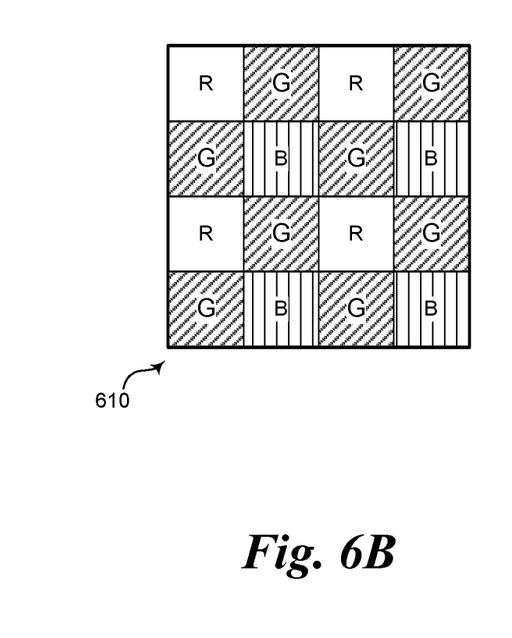

FIGS. 6A-6B illustrate an embodiment of a head-wearable display (HWD) 600. HWD 600 includes an eyepiece 602 with an output coupler 604 formed therein in a position that will substantially align with a user's eye. Eyepiece 602 can be as described for FIGS. 4A-4B, and although illustrated as round it can have other shapes in other embodiments. Waveguide 606 is formed in eyepiece 606 and extends from output coupler 604 to the edge or periphery of eyepiece 602. A display source 608 with a color filter array 610 optically coupled thereto is positioned at the periphery of eyepiece 602 so that it can launch display light into waveguide 606.

Output coupler 604 includes a set of four reflective switchable mirrored surfaces, although a different number of switchable mirrored surfaces is possible in other embodiments; other embodiments, for instance, can use more than four or less than four switchable mirrored surfaces. The reflectivity of the switchable mirrored surfaces can be varied substantially between 0% and 100%, or any sub range thereof, at a selected frequency. The selected frequency is high enough that the mirror switching will not be noticed by a user; in one embodiment, for instance, the switching rate could be 120 Hz to provide 60 Hz for each subset of reflecting surfaces. In other embodiments the switching rate can be higher than 120 Hz. Generally the mirror switching frequency will be synchronized with the display frequency so that a user perceives no flicker or other disruption of the display light.

As in other embodiments, each individual reflective surface in the set of four reflective surfaces can reflect in a different direction or they can be grouped into subsets within which all reflective surfaces reflect in the same direction. In the illustrated embodiment a first subset of reflective surfaces labeled M1 can reflect display light in one direction and a second subset of reflective surfaces labeled M2 can reflect in a second direction, so that the set of mirrored surfaces reflects display light in two directions. Generally the display frequency will be synchronized with the mirror switching frequency to that the user does not perceive any flicker or other disruption of the display light.

FIG. 6B illustrates an embodiment of a color filter array 610 that can be used with HWD 600. Color filter array 610 is a matrix of tessellated color filters. The illustrated array 610 uses the red-green-blue (RGB) primary color set with individual red, green, and blue color filters arranged in the well-known Bayer pattern. But other color filter array embodiments can use other primary color sets—cyan-magenta-yellow (CMY), for instance—and can include more than three colors. In other embodiments the color filter array can also include filters that are sometimes not strictly considered "colors," like clear (colorless or neutral) filters.

In operation of HWD 600 display light from display source 608 travels through filter array 610 and is launched into waveguide 606. Color-filtered display light travels through waveguide 606 to output coupler 604, where switchable mirrored surfaces M1 and M2 alternately pass or redirect the color-filtered display light toward a user's eye at the selected frequency. In one embodiment, the switching frequencies of mirrored surfaces M1 and M2 can be synchronized with the display to that the image reflected by each reflective surface is unique.

Figure 7A:
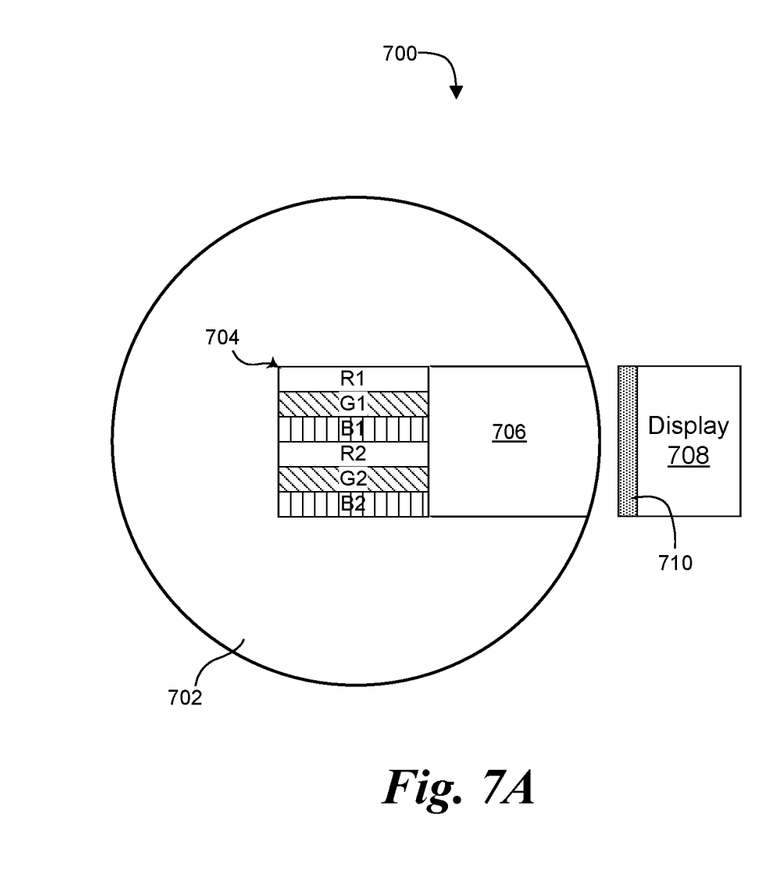
FIGS. 7A-7B are diagrams of another embodiment of a head-wearable display including see-through eyepiece and embodiments of a display source that can be used with the illustrated eyepiece.
Figure 7B:
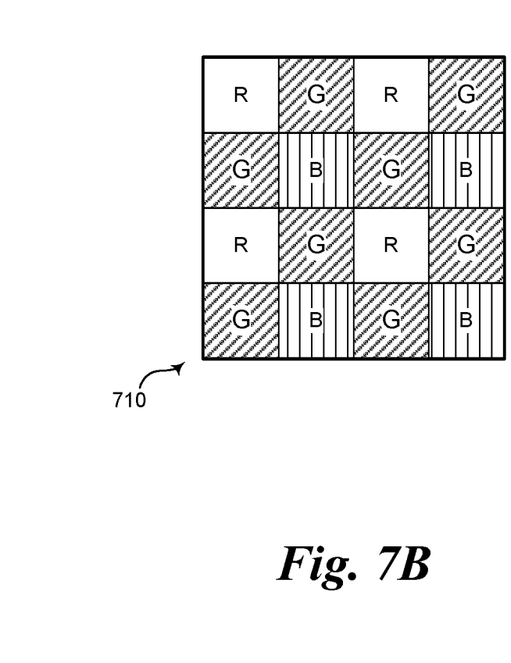

FIGS. 7A-7B illustrate an embodiment of a head-wearable display (HWD) 700. HWD 700 similar in most respects to HWD 600. HWD 700 includes an eyepiece 702 with an output coupler 704 formed therein in a position that will substantially align with a user's eye. Eyepiece 702 can be as described for FIGS. 4A-4B and, although shown round, it can have other shapes in other embodiments. Waveguide 706 is formed in eyepiece 706 and extends from output coupler 704 to the edge or periphery of eyepiece 702. A display source 708 having a color filter array 710 optically coupled thereto is positioned at the periphery of eyepiece 702 so that it can launch color-filtered display light into waveguide 706.

Color filter array 710 is a matrix of tessellated color filters. The illustrated array uses the red-green-blue (RGB) primary color set, with the individual red, green, and blue color arranged in the well-known Bayer pattern. But other CFA embodiments can use other primary color sets (CMY, for instance) and can include more than three colors, and in some embodiments can also include filters that are sometimes not strictly considered "colors," like clear (colorless or neutral) filters.

Output coupler 704 includes a set of six reflective surfaces, although a different number of reflective surfaces is possible in other embodiments; other embodiments, for instance, can use more than six or less than six reflective surfaces. In the illustrated embodiment red, green, and blue color filters are positioned on the reflective surfaces, but in another embodiment the set of reflective surfaces can include wavelength-selective dielectric thin film coatings to provide color filtering.

As in previous embodiments, each individual reflective surface in the set of six reflective surfaces can reflect in a different direction or they can be grouped into subsets within which all reflective surfaces reflect in the same direction. In one embodiment equivalent colored surfaces can point in the same direction to achieve unique images for each tiled FOV, although this results in each tiled FOV being a different color. Hence in the illustrated embodiment one subset of two surfaces can include two red surfaces that reflect in a first direction, another subset can include two green surfaces that reflect in a second direction, and a third subset can include two blue surfaces that reflect in a third direction. In operation of HWD 700 display light from display source 708 travels through filter array 710 and is launched into waveguide 706. Color-filtered display light travels through waveguide 706 to output coupler 704, which redirects the display light toward a user's eye, as shown on FIGS. 1A-1B.

Figure 8A:
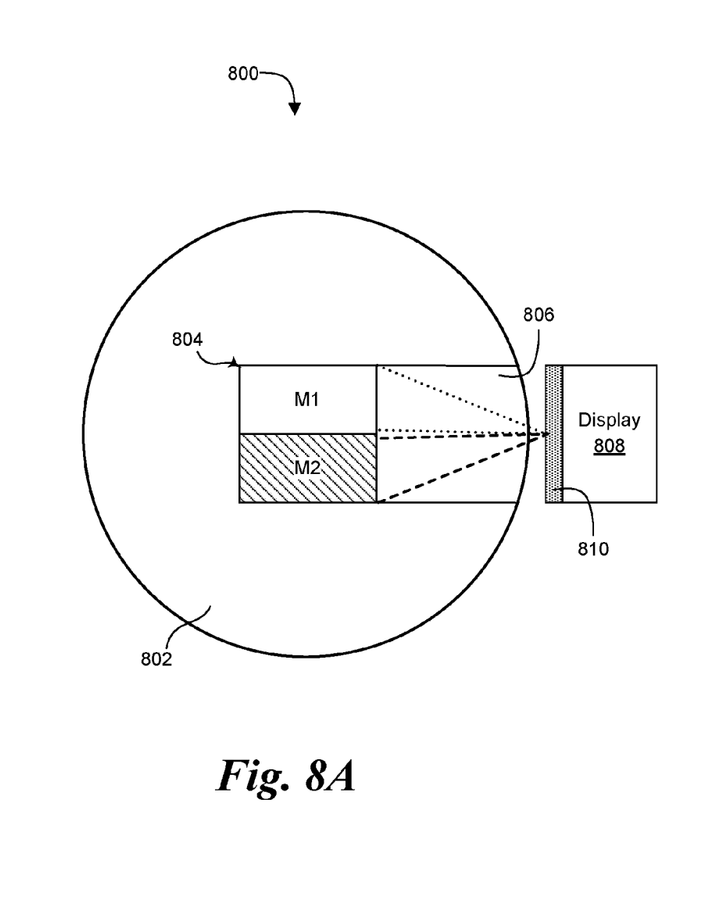
FIGS. 8A-8B are diagrams of another embodiment of a head-wearable display including see-through eyepiece and embodiments of a display source that can be used with the illustrated eyepiece.
Figure 8B:
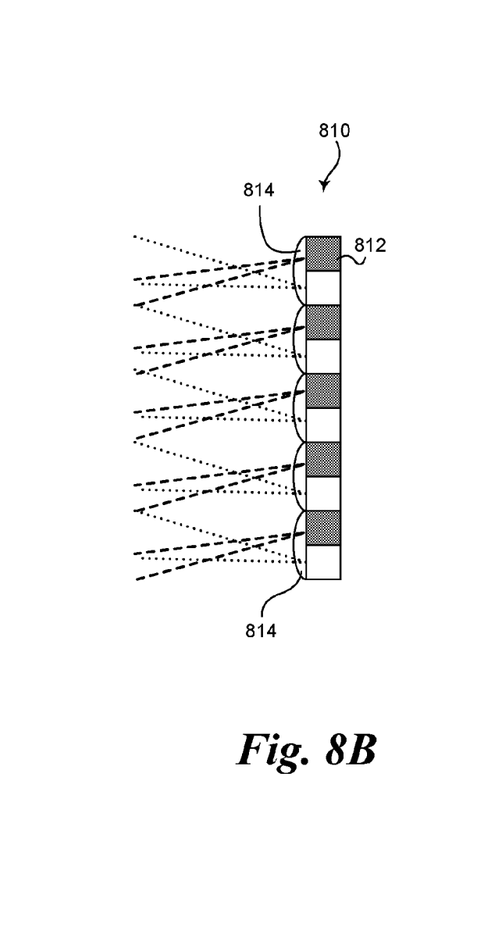

FIGS. 8A-8B illustrate an embodiment of a head-wearable display (HWD) 800. HWD 800 includes an eyepiece 802 having an output coupler 804 formed therein in a position that will substantially align with a user's eye. Eyepiece 802 can be as described for FIGS. 4A-4B and, although shown round, it can have other shapes in other embodiments. Waveguide 806 is formed in eyepiece 802 and extends from output coupler 804 to the edge or periphery of eyepiece 802. A display source 808 has a lens assembly 810 optically coupled thereto and is positioned at the periphery of eyepiece 802 so that it can launch display light into waveguide 806.

Output coupler 804 includes a set of two individual reflective surfaces M1 and M2, of which M1 reflects in one direction and M2 reflects in another direction. Lens assembly 810 directs display light from one portion of display 808 to reflective surface M1 and display light from another portion of display 808 to reflective surface M2.

FIG. 8B illustrates an embodiment of a lens assembly 810 that can be used with HWD 800. In the illustrated embodiment cylindrical lenses 814 are positioned across display 808 over pixels 812, such that display light from certain pixels will be directed to reflective surface M1 and display light from other pixels will be directed to reflective surface M2. Other embodiments of lens assembly 810 can include different lens arrangements, such as arrays of microlenses, and can divide the display light differently than shown, for instance into more segments if output coupler 804 has more reflective surfaces.

Figure 9A:
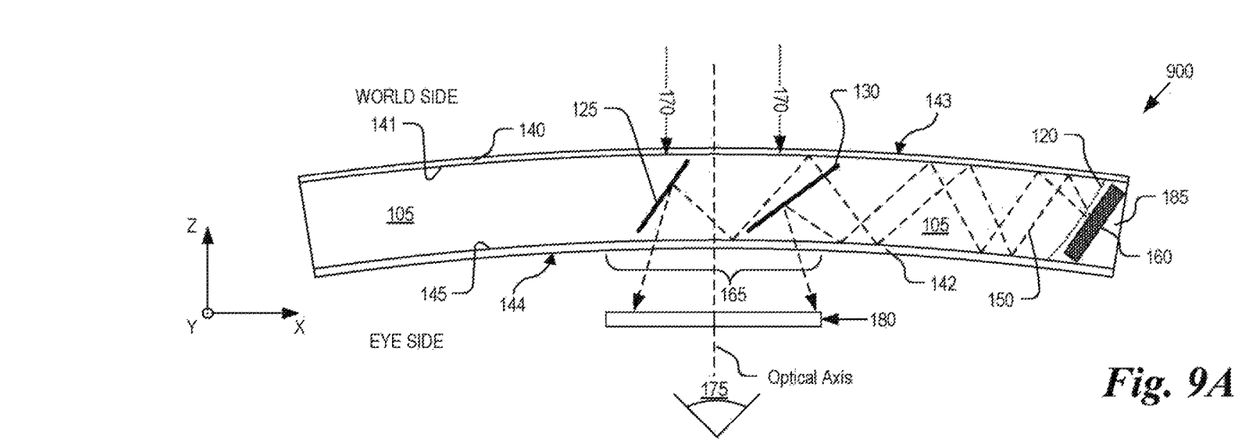
FIGS. 9A-9B are top and rear views, respectively, of another embodiment of a see-through eyepiece for a head-mounted display
Figure 9B:
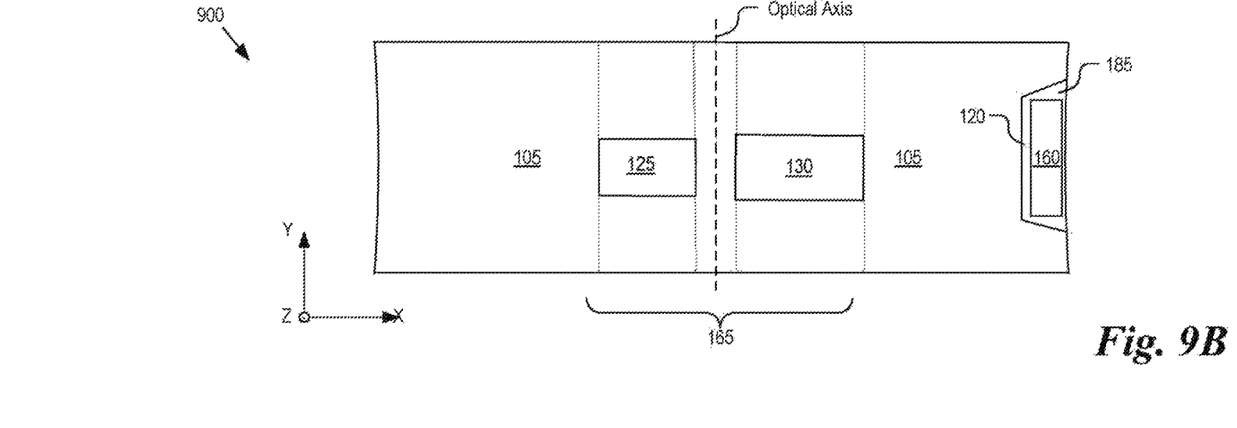

FIGS. 9A-9B illustrate an alternative embodiment of a head-wearable display 900. HWD 900 is in most respects to HWD 100 (see FIGS. 1A-1B). The primary difference between HWDs 900 and 100 is that in HWD 900 the reflective faces that make up the output coupler are positioned differently. In HWD 900, the set of reflective surfaces 125 and 130 are horizontally spaced apart from each other (i.e., spaced in the x direction) but are both positioned in viewing region 165. This is in contrast to HWD, in which the reflective surfaces are vertically spaced from each other (i.e., spaced apart in the y direction; see FIGS. 1A-1B). In other embodiments (not shown) the reflective surfaces can be both horizontally and vertically spaced relative to each other. As in HWD 100, individual reflective surface 125 and 130 are positioned at an angle relative to each other and at different angles relative to an optical axis, so that the output coupler, with its set of reflective surfaces, reflects display light in at least two different directions.

Figure 10:
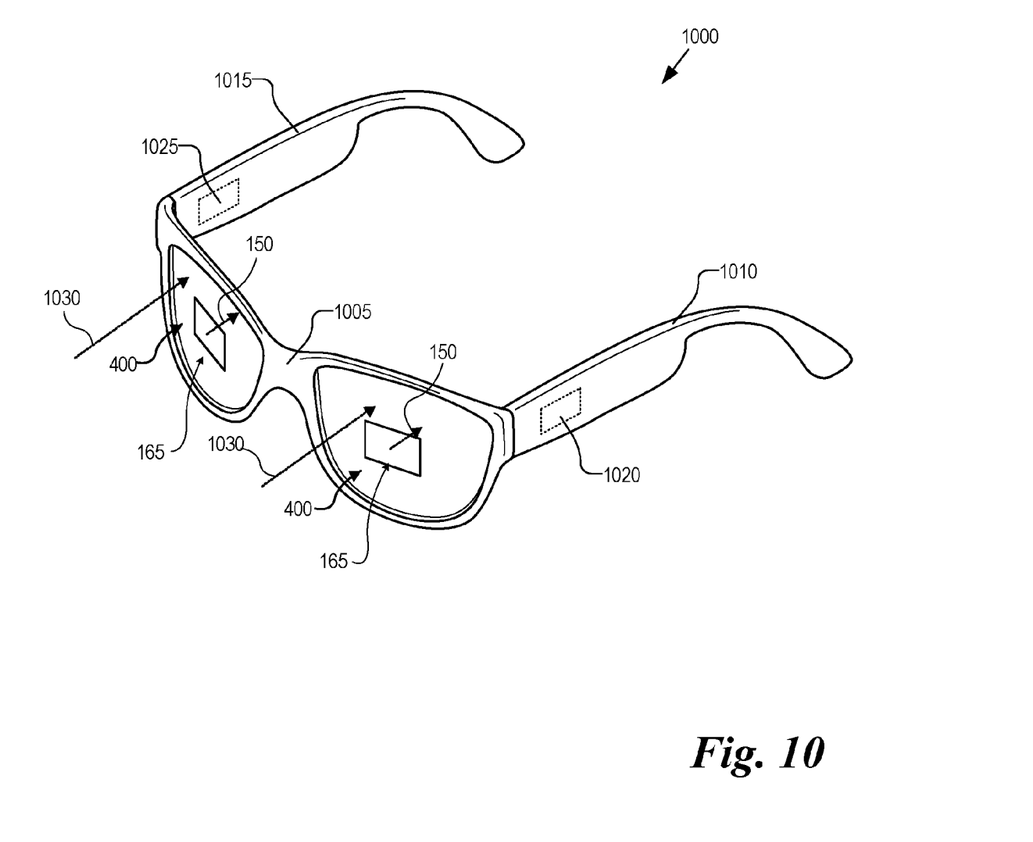
FIG. 10 is a perspective view of an embodiment of a binocular head-wearable display including see-through eyepieces.

FIG. 10 illustrates an embodiment of a head wearable display 1000 that incorporates a left and right instance of eyepieces 100 and/or 400. Head wearable display 1000 includes left and right instances of eyepiece 400. Eyepieces 400 are mounted to a frame assembly, which includes a nose bridge 1005, left ear arm 1010, and right ear arm 1015. Interior cavities 10100 and 225 within left ear arm 1010 and right ear arm 1015 may contain various electronics including a microprocessor, interfaces, one or more wireless transceivers, a battery, a speaker, a controller, etc. In one embodiment, either of nose bridge 1005 or the front facing corners of ear arms 1010 and 1015 can contain a camera module for capturing forward facing images of the external scene or rear facing images of the user's eye(s). Although the figure illustrates a binocular embodiment, head wearable display 1000 can also be implemented as a monocular display with only one curved eyepiece 400 aligned with only a single user eye when worn.

Eyepieces 400 are edged to conform to the shape of the frame assembly and secured into an eyeglass arrangement so head wearable display can be worn on the head of a user. The left and right ear arms 1010 and 1015 rest over the user's ears while nose bridge 1005 rests over the user's nose. The frame assembly is shaped and sized to position output couplers in front of the user's eyes. In one embodiment, the output couplers are positioned relative to the user's eyes such that the user looks slightly down (e.g., 7 degrees) and to the right or left (e.g., 15 degrees) to see the display image. Other angles may be implemented and other frame assemblies having other shapes may be used (e.g., a single contiguous headset member, a headband, goggles type eyewear, etc.). Output couplers within viewing regions 165 operate to redirect display light to each eye while allowing ambient light to pass through, thereby providing the user with an augmented view of the real world.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. An eyepiece for a head-wearable display, the eyepiece comprising:
 a curved light guide for guiding display light via total internal reflection between a peripherally-located input surface and a viewing region; and
 an output coupler disposed across the viewing region to redirect the display light towards an eyeward direction for output from the curved light guide, the output coupler having an optical axis and comprising a set of reflective surfaces that includes at least two individual reflective surfaces to reflect incident display light toward the eyeward direction in at least two different directions relative to the optical axis of the output coupler.

2. The eyepiece of claim 1, wherein at least one of the individual reflective surfaces has positive or negative optical power.

3. The eyepiece of claim 1, wherein the set of reflective surfaces includes more than two individual reflective surfaces and includes at least one subset of two or more individual reflective surfaces that reflect incident display light in the same direction relative to the optical axis.

4. The eyepiece of claim 1, wherein the set of reflective surfaces includes more than two individual reflective surfaces each individual reflective surface reflects incident display light in a different direction relative to the optical axis than any other individual reflective surface in the set.

5. The eyepiece of claim 1, wherein the set of reflective surfaces includes a subset of individual reflective surfaces having a polarizing film on them that passes display light having a first polarization state and a subset of individual reflective surfaces having a polarizing film on them that passes display light having a second polarization state.

6. The eyepiece of claim 1, wherein the set of reflective surfaces includes a polarization-dependent dielectric thin film coating on them, so that a subset of individual reflective surfaces reflects display light having a first polarization state and another subset of individual reflective surfaces reflects display light having a second polarization state.

7. The eyepiece of claim 1, wherein the set of reflective surfaces includes a subset of individual reflective surfaces having a color filter on them that passes display light having a first color, a subset of individual reflective surfaces having a color filter on them that passes display light having a second color, and a subset of individual reflective surfaces having a color filter on them that passes display light having a third color.

8. The eyepiece of claim 1, wherein the set of reflective surfaces include a wavelength-selective dielectric thin film coating on them such that a first subset of individual reflective surfaces reflects display light having a first color, a second subset of individual reflective surfaces reflects display light having a second color, and a third subset of individual reflective surfaces reflects display light having a third color.

9. The eyepiece of claim 1, wherein the set of reflective surfaces includes a subset of individual reflective surfaces having a color filter on them that passes display light having a first color and a subset of individual reflective surfaces having a color filter on them that passes display light having second and third colors.

10. The eyepiece of claim 1, wherein the set of reflective surfaces include a wavelength-selective dielectric thin film coating on them such that a subset of individual reflective surfaces reflects display light having a first color and another subset of individual reflective surfaces reflects display light having second and third colors.

11. The eyepiece of claim 1, wherein the set of reflective surfaces includes a subset of individual reflective surfaces that reflect a first portion of the display light and a subset of individual reflective surfaces that reflects a second portion of the display light.

12. The eyepiece of claim 1, wherein each individual reflective surface in the set of reflective surfaces is a switchable mirror that can be switched between a reflective state and a non-reflective state.

13. A head-wearable display comprising:
 a display source to generate display light;
 an eyepiece to guide the display light to a viewing region, the eyepiece comprising:
  a curved light guide for guiding display light via total internal reflection between a peripherally-located input surface and the viewing region,
  an output coupler disposed across the viewing region to redirect the display light towards an eyeward direction for output from the curved light guide, the output coupler having an optical axis and comprising a set of reflective surfaces that includes at least two individual reflective surfaces to reflect incident display light toward the eyeward direction in at least two different directions relative to the optical axis of the output coupler; and
  a frame assembly to support the eyepiece for wearing on a head of a user with the viewing region positioned in front of an eye of the user.

14. The head-wearable display of claim 13, wherein at least one of the individual reflective surfaces has positive or negative optical power.

15. The head-wearable display of claim 13, wherein the set of reflective surfaces includes more than two individual reflective surfaces and includes at least one subset of two or more individual reflective surfaces that reflect incident display light in the same direction relative to the optical axis.

16. The head-wearable display of claim 13, wherein the set of reflective surfaces includes more than two individual reflective surfaces each individual reflective surface reflects incident display light in a different direction relative to the optical axis than any other individual reflective surface in the set.

17. The head-wearable display of claim 13, wherein the set of reflective surfaces includes a subset of individual reflective surfaces having a polarizing film on them that passes display light having a first polarization state and a subset of individual reflective surfaces having a polarizing film on them that passes display light having a second polarization state.

18. The head-wearable display of claim 17, further comprising a polarizer optically coupled to the display source to polarize the display light, wherein the polarizer comprises an array of polarizers including rows and columns of polarizing cells, wherein the polarizing cells alternate row-wise and column-wise between the first polarization state and the second polarization state.

19. The head-wearable display of claim 17, further comprising a polarizer optically coupled to the display source to polarize the display light, wherein the polarizer comprises:
 a switchable polarizer whose entire area can be switched between the first polarization state and the second polarization state at a selected frequency; and
 a circuit coupled to the switchable polarizer to switch the polarization between the first polarization state and the second polarization state at the selected frequency.

20. The head-wearable display of claim 13, wherein the set of reflective surfaces includes a polarization-dependent dielectric thin film coating on them so that a subset of individual reflective surfaces reflects display light having a first polarization state and another subset of individual reflective surfaces reflects display light having a second polarization state.

21. The head-wearable display of claim 13, further comprising a color filter array optically coupled to the display source, wherein the color filter array includes individual color filters of the first color, individual color filters of the second color, and individual color filters of the third color.

22. The head-wearable display of claim 21, wherein the set of reflective surfaces includes a subset of individual reflective surfaces having a color filter on them that passes display light having a first color, a subset of individual reflective surfaces having a color filter on them that passes display light having a second color, and a subset of individual reflective surfaces having a color filter on them that passes display light having a third color.

23. The head-wearable display of claim 21, wherein the set of reflective surfaces include a wavelength-selective dielectric thin film coating on them such that a first subset of individual reflective surfaces reflects display light having a first color, a second subset of individual reflective surfaces reflects display light having a second color, and a third subset of individual reflective surfaces reflects display light having a third color.

24. The head-wearable display of claim 21, wherein the set of reflective surfaces includes a subset of individual reflective surfaces having a color filter on them that passes display light having a first color and a subset of individual reflective surfaces having a color filter on them that passes display light having second and third colors.

25. The head-wearable display of claim 21, wherein the set of reflective surfaces include a wavelength-selective dielectric thin film coating on them such that a subset of individual reflective surfaces reflects display light having a first color and another subset of individual reflective surfaces reflects display light having second and third colors.

26. The head-wearable display of claim 13, wherein the set of reflective surfaces includes a first subset of reflective surfaces that reflect a first portion of the display light and a second subset of reflective surfaces that reflects a second portion of the display light.

27. The head-wearable display of claim 26, further comprising a plurality of lenses optically coupled to the display source wherein some of the plurality of lenses direct the first portion of the display light to the first subset of reflective surfaces and wherein the remainder of the plurality of lenses direct the second portion of the display light to the second subset of reflective surfaces.

28. The head-wearable display of claim 13, wherein each individual reflective surface in the set of reflective surfaces is a switchable mirror that can be switched between a reflective state and a non-reflective state.

29. The head-wearable display of claim 28, further comprising a circuit coupled to the switchable mirrors to switch the reflective state of each switchable mirror between a reflective state and a non-reflective state at a selected frequency.

30. The head-wearable display of claim 29, wherein the selected mirror-switching frequency is synchronized with the display so that an image reflected by each reflective surface is unique.

* * * * *